G. HOLMES.
CAGER AND SUMP GUARD.
APPLICATION FILED NOV. 2, 1910.

1,031,714.

Patented July 9, 1912.

2 SHEETS—SHEET 1.

Inventor
Grant Holmes,

Witnesses

By

Attorney

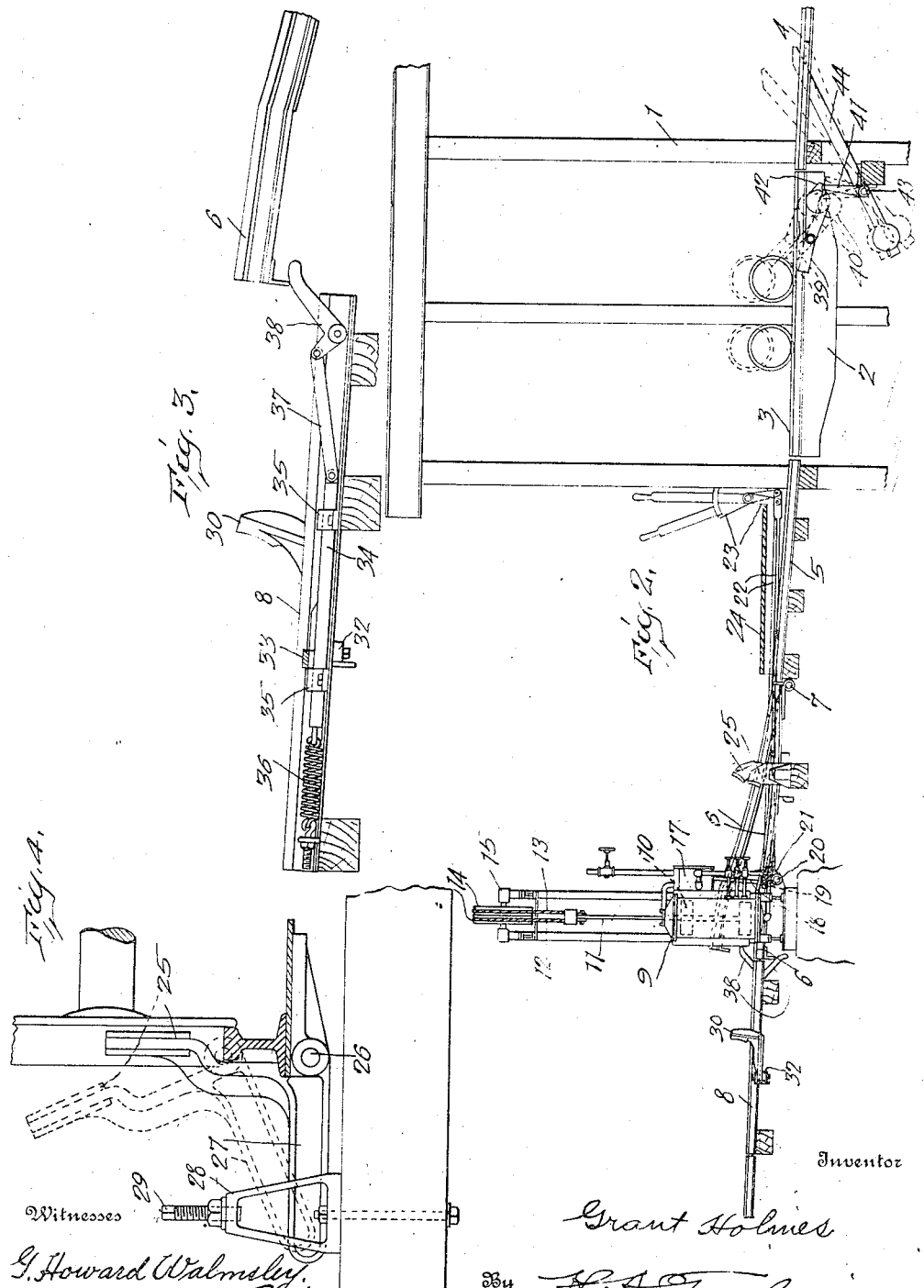

UNITED STATES PATENT OFFICE.

GRANT HOLMES, OF DANVILLE, ILLINOIS, ASSIGNOR TO ROBERT HOLMES & BROTHERS, OF DANVILLE, ILLINOIS, A CORPORATION OF ILLINOIS.

CAGER AND SUMP-GUARD.

1,031,714.  Specification of Letters Patent.  Patented July 9, 1912.

Application filed November 2, 1910. Serial No. 590,291.

*To all whom it may concern:*

Be it known that I, GRANT HOLMES, a citizen of the United States, residing at Danville, in the county of Vermilion and State of Illinois, have invented certain new and useful Improvements in Cagers and Sump-Guards, of which the following is a specification, reference being had therein to the accompanying drawings.

This invention relates to cagers and sump guards and is designed more particularly for delivering cars to elevators in coal mines.

The object of the invention is to provide a cager, which will be actuated by power-operated mechanism; also to provide a series of automatic stops, whereby the delivery of the car to the cager, the discharge of the same therefrom and the retention of the car on the elevator platform or cage will be automatically controlled; and to so construct these stops that those which control the delivery of the car to the cager and the discharge of the car therefrom will be controlled by the movement of the cager and that which retains the car on the cage will be controlled by the movement of the cage and by the discharge of the empty car therefrom, thereby enabling the caging of the loaded cars and the discharge of the empty cars to be controlled by the controlling devices for the power-operated mechanism.

In the accompanying drawings, Figure 1 is a top, plan view of a cager embodying my invention, showing the same applied to a double track; Fig. 2 is a side elevation of what is shown in Fig. 1; Fig. 3 is a sectional view, taken on the line *x x* of Fig. 1 and looking in the direction of the arrows; and Fig. 4 is a detail view of the stop for retaining the cars on the cager.

In these drawings I have illustrated one embodiment of my invention and have shown the same in connection with an elevator comprising the usual shaft 1 in which is supported a vertically movable elevator platform or cage 2 provided with a track section 3 to support the car. This cage may be operated in any suitable manner, and, when in its normal position, which, in the construction here shown, is its lowermost position, one end of the track 3 thereof will be in alinement with the track 4 onto which the empty car carried by the cage may be discharged. At the same time the other end of the track 3 of the cage will be in alinement with a track which delivers the loaded car thereto. This track comprises a fixed track section 5 arranged immediately adjacent to the elevator and preferably sloping toward the same to enable the car to be delivered from the track to the cage by force of gravity. Immediately beyond the fixed track section and comprising a part of the same track is a movable track section 6, which, in the present form of the device, has that end adjacent to the fixed track section 5 pivotally supported, as indicated at 7, and its opposite end free to move vertically and which constitutes the cager proper. Arranged beyond the movable track section or cager and also forming a part of the same track is a second fixed track section 8 which preferably slopes toward the movable track section. In the operation of the cager the cars are fed forward to a point near the free end of the movable track section where they are retained until the movable track section is in its lowermost or receiving position. The foremost car is then delivered to the movable track section or cager proper, on which it is retained until the cage is in a position to receive it. The movable track section is then moved into an inclined position and the loaded car discharged therefrom over the track 5 and onto the track 3 of the cage, where it bumps against the end of the empty car which is on the cage, and thereby causes this car to be discharged from the cage onto the track 4. As the empty car passes from the cage a suitable stop moves into position to check the movement of the loaded car and retain the same on the cage. The specific construction and arrangement of the several parts coöperating to secure the results above outlined may, of course, be widely varied to adapt the same to various conditions or requirements, and it will be understood that the parts here shown as accomplishing these results have been chosen for the purpose of illustration only.

The movable track section is preferably controlled by a suitable power-operated hoisting device which is here shown as comprising a vertically arranged fluid pressure cylinder 9 arranged at one side of and adjacent to the free end of the movable track section or cage proper. This cylinder is provided with the usual piston 10 and piston rod 11. To the upper end of the piston rod 11 are connected two cables 12 and 13 which extend over sheaves 14 carried by a frame 15. The cable 13 passes about its sheave, thence downward and is connected with the free end of the track on that side thereof adjacent the cylinder. The cable 12 extends across the track, about a sheave 16 mounted on the frame 15 on the opposite side of the track, thence downward and is connected to the free end of the track on that side thereof opposite the cylinder. The admission of steam, or other motor fluid, to the cylinder is controlled by a valve 17. This valve may be of any suitable character and is controlled by a pitman 18 connected at its upper end with the valve and at its lower end to a crank 19 carried by a shaft 20. This shaft is a rockshaft and is connected by means of a second crank 21 and a connecting rod 22 with a lever 23 which is arranged at that point from which it is desired to control the cager. In the present instance the lever is arranged at a point immediately adjacent to the elevator and a platform 24 is provided for the operator from which he may watch the operation of the cage and control the cager accordingly. The movement of the rockshaft 20 in one direction opens the valve 17 and admits steam above the piston 10 and cylinder 9, thereby depressing the same and elevating the free end of the movable track section and imparting to the track section such a degree of inclination as to discharge the car therefrom and cause the same to pass off the movable section and over the intervening fixed track section with a sufficient degree of force to dump the empty car off the cage. When the rockshaft is moved in the opposite direction the steam will be cut off from the upper end of the cylinder and the exhaust opened, thereby permitting the track section to return to its lowermost or normal position of its own weight. The specific construction of this hoisting mechanism is not new, it being shown and described in Patent No. 804,950, granted to me Nov. 21, 1905, for an automatic car lift.

The movable track section 6 when in its normal position is preferably slightly inclined, but whether it is inclined or perfectly level it is desirable that a suitable stop should be provided to retain the car in a proper position thereon and prevent its discharge therefrom until the movable track section has assumed the proper degree of inclination. I have, therefore, provided an automatically controlled stop by means of which the movement of the car is checked at the proper point and the car released when the movable track section has been moved into its inclined position. Preferably, there are two of these stops, one adjacent to each rail of the track. As here shown each stop comprises a dog 25 pivotally mounted on the track section and preferably at a point beneath the rail, as indicated at 26. This dog comprises an upwardly extending arm having an offset portion adapted to extend above the rail and into the path of the wheel of the car. The dog has also a laterally extending projection or arm 27 extending outwardly or away from the track. The arm or projection 27 is of sufficient weight to cause the dog to move about its pivotal center and to carry the same away from the rail and out of the path of the car wheel. A suitable fixed stop is arranged to engage the projection or arm 27 and move the dog into and out of its operative position at the proper times. As here shown this stop comprises a bracket 28 having a vertical slot through which the arm or projection 27 extends. When the movable track section is in its lowermost position the arm 27 will engage the bottom of the slot in the bracket and will be held in a position to support the dog above the track rail and in the path of the car wheel, as indicated in full lines in Fig. 4. As the track section moves upward the frictional contact between the car wheel and the dog will hold the dog against lateral movement until positive force is applied to the arm 27. This force is so applied to the arm when it engages the upper end of the slot in the bracket 28. When the arm has so engaged the upper end of the slot, and is held against further movement, the continued movement of the track section will cause the dog to be moved about its pivotal center and out of the path of the car wheel, thereby permitting the car to be discharged from the movable track section.

Means are preferably provided for varying the degree of inclination which must be imparted to the track section before the car is discharged therefrom. This is here accomplished by providing an adjustable stop for the upper end of the bracket 28 which is shown as comprising a set screw 29 screw-threaded in the upper end of the bracket and having its inner end arranged in the path of the arm 27 and constituting the upper limit of movement of that arm. As soon as the dog is moved out of engagement with the wheel the arm 27 will move downward of its own weight until it engages the bottom of the bracket 28 and will remain in this position until the track section is moved to its lowermost position, which movement will cause the dog and its arm to be again moved about their pivotal center to place the dog in its operative position, that is, in a position to engage the car wheel. Suitable stops are also provided to check the movement of the car following the one which has been delivered to the cager and to retain this car on the fixed track section 8 until the car on the cager has been discharged and the cager has returned to its normal position. When a car has been delivered to the cager and is in contact with the stops 25 the forward end of the succeeding car will engage the rear end thereof and the movement of the succeeding car will, of course, be checked. Arranged alongside of the rails of the track section 8 are two laterally movable dogs 30 which are located between the cager and the line on which the wheels of the succeeding car stand when said succeeding car is in engagement with a car on the cager. As the cager is elevated and the car discharged therefrom the stops 30 are automatically moved into position above the track rails and into the path of said succeeding car. When the cager descends to its normal position the stops 30 are automatically moved out of the paths of the car wheels and said succeeding car is permitted to move onto the cager. In the mechanism here shown for accomplishing this result the laterally movable dogs are pivotally connected to the track section on vertical axes, as indicated at 31, the connection being preferably made with a transverse bar 32 which is rigidly secured to the track section and is arranged to support the dogs in their proper positions relative to the track rails. Connected to the dogs 30 at points forward of their pivotal centers are levers 33 pivotally connected one to the other at their inner ends, after the manner of toggle levers. Connected to the levers 33 at their point of connection one to the other is a bar 34 which is preferably slidably mounted in suitable guides 35 and is capable of movement longitudinally to the track section. A spring 36 connected to that end of the bar 34 opposite the cager tends to move the dogs or stops 30 toward the track rails and into their operative positions. That end of the slide bar 34 adjacent to the cager is connected by means of a link 37 with one arm of a bell crank lever 38, the other arm of which extends beneath and into the path of the movable track section or cager 6. Consequently, when the cager descends to its lowermost position the bell crank lever will be actuated to move the slide bar forward and to move the dogs or stops 30 away from the track rails, thereby permitting the car on the track section 8 to move onto the cager. When the cager or movable track section is elevated the bell crank lever is released and the spring 36 moves the dogs into the path of the wheels of the succeeding car.

When the car has been delivered by the cager onto the cage or elevator platform this cage is elevated, the car removed therefrom, an empty car substituted therefor and the cage returned to its lowermost position, all in a well known manner. A suitable stop is provided which will engage the wheels of the empty car, retain the same on the cage until the latter is in its normal position, which, in the present instance, is its lowermost position, and will then automatically release the empty car to permit it to be discharged from the cage, and, as soon as the empty car is discharged, will move into operative position to check the movement of the loaded car which is being delivered to the cage. As here shown this stop comprises a lever 39 pivotally mounted between its ends on the elevator platform at a point below the rails of the track thereon. One end of this lever is weighted, as indicated at 40, and normally this weight will tend to move the opposite end of the lever upward and into position to engage the wheel of a car passing over the track 3. This position is occupied by the stop as the cage descends with an empty car and is indicated in dotted lines in Fig. 3.

A suitable trigger 41 is pivotally mounted on the frame work of the shaft 1 and is so controlled that as the cage descends the upper end of the trigger will be engaged by a projection or lug 42 carried by the weighted end of the lever or stop 39 and will check the downward movement of this end of the lever or stop. The continued movement of the cage will cause the lever or stop to be moved about its pivotal center and the end thereof depressed to a point below the track rail and out of the path of the car wheel, thereby releasing the empty car and permitting it to be discharged from the cage when it is engaged by the loaded car discharged from the cager. The trigger 41 is preferably mounted on a transverse shaft 43 to which is rigidly secured a lever 44, one end of which is provided with a weight which tends to move the opposite end thereof above the track 4 and into the path of a car passing over that track. When the trigger is in engagement with the weighted end of the stop 39 the end of the lever 44 will be in a position to be engaged by the car discharged from the cage. This car will depress the upper end of the lever 44, rock the shaft 43 and move the trigger out of engagement with the stop 39, thereby permitting this stop to be moved by the weight 40 into the path of the wheels of the loaded car which is being delivered to the cage. In the present embodiment of the invention I have shown the same as applied to a double track, each track being provided with a cager, and have shown the elevator as comprising two independently movable cages or platforms, arranged in the described positions with relation to the respective tracks. It will be understood, however, that the invention is equally applicable to a single track or to any desired number of tracks.

The operation of the several parts of the mechanism have been clearly described and it will be apparent that the movable track section or cager proper is operated by power-actuated mechanism which may be controlled from an advantageous point. Further, it will be apparent that the movement of the car is automatically controlled throughout the caging operation; and that the stops by means of which this control is effected are controlled by the movement of the cager. In two instances this control is direct, while in the third instance the stop is controlled by the car which is discharged by the cager onto the cage and which, in turn, causes the empty car to be discharged from the cage, thereby actuating the controlling mechanism to release the stop carried by the cage.

I do not claim as my invention the broad idea of providing a pivoted track section with a movable stop to control the movement of the car thereon, which stop is actuated by the movement of the track section about its pivotal center. This broad idea is disclosed in Patent No. 774,047, granted to W. H. Davis and A. M. Wood, Nov. 1, 1904. I do, however, consider myself to be the first to provide a laterally movable stop controlled by the movement of the track section and also the first to provide a stop carried by the movable track section itself and actuated by the movement thereof.

While the apparatus is shown and is above described as adapted to handle a single car it will be obvious that it can be made to handle a plurality of cars by merely enlarging the construction and without departing in any sense from the principles involved. Further, it will be apparent that many minor changes in the construction and arrangement of the parts are possible without materially changing the results achieved and I, therefore, wish it to be understood that I do not desire to be limited to the details of construction shown and described, for obvious modifications will occur to a person skilled in the art.

Having thus fully described my invention, what I claim as new and desire to secure by Letters Patent, is:—

1. The combination, with an elevator, of a track leading to said elevator and comprising a movable section and a fixed section interposed between said movable section and said elevator, operating mechanism connected with said movable section to move it into an inclined position, and means for controlling said operating mechanism.

2. The combination, with an elevator, of a track leading to said elevator and comprising a movable section and a fixed section interposed between said movable section and said elevator, power-operated mechanism arranged adjacent to and connected with said movable section to move it into an inclined position, and means arranged near said elevator for controlling said mechanism.

3. The combination, with an elevator, of a track leading thereto and comprising a section adjacent to said elevator and a second section lying beyond the first-mentioned section and having that end adjacent thereto pivotally supported, power-operated mechanism arranged adjacent to said pivoted track section to move the same about its pivotal center, and means arranged near said elevator for controlling said operating mechanism.

4. The combination, with an elevator, of a track leading thereto and comprising a section adjacent to said elevator, and a second section lying beyond the first-mentioned section and having that end adjacent thereto pivotally supported, a fluid pressure cylinder arranged near the free end of said pivoted track section, a piston mounted in said cylinder and operatively connected with said pivoted track section, a valve to control the flow of fluid to said cylinder, and a manually operated controlling lever for said valve.

5. The combination, with an elevator comprising two independently movable platforms, of tracks leading to the respective platforms and each comprising a movable section, power-operated mechanism to move said movable track sections into inclined positions, a platform arranged between said tracks near said elevator, and means supported near said platform for controlling said power-operated mechanism to cause said movable track sections to be independently moved into inclined positions.

6. The combination, with a movable track section, and means for moving the same into an inclined position, of a laterally movable stop mounted near said track section, and means for automatically moving said stop into and out of its operative position.

7. The combination, with a movable track section, and means for moving the same into an inclined position, of a laterally movable stop mounted near each side of said track section, and means controlled by the movement of said track section for moving said stops into and out of their operative positions.

8. The combination, with a movable track section, and means for moving the same into an inclined position, of a laterally movable stop mounted near said track section and arranged to extend above one of the rails thereof when said track section is in its normal position, and means controlled by the movement of said track section into an inclined position for moving said stop away from said rail.

9. The combination, with a movable track section, and means for moving the same into an inclined position, of a stop movably mounted on said track section and arranged to extend above one of the rails thereof when said track section is in its normal position, and means controlled by the movement of said track section into an inclined position for moving said stop away from said rail.

10. The combination, with a movable track section, and means for moving the same into an inclined position, of a movable stop carried by said track section, and means controlled by the movement of said track section to move said stop into and out of its operative position.

11. The combination, with a movable track section, and means for moving the same into an inclined position, of a stop movably mounted on said track section, means to hold said stop in operative position when said track section is in its normal position and to move said stop into an inoperative position when said track section is moved into an inclined position.

12. The combination, with a pivoted track section, and means for moving the same about its pivotal center, of a laterally movable stop, and means actuated by the movement of said track section to move said stop into an inoperative position.

13. The combination, with a pivoted track section and means for moving the same about its pivotal center, of a laterally movable stop, and means actuated by the movement of said track section to move said stop into and out of its operative position.

14. The combination, with a pivoted track section, and means for moving the same about its pivotal center, of a stop pivotally mounted on said track section, and means positively actuated by the movement of said track section for moving said stop about its pivotal center.

15. The combination, with a pivoted track section, and means for moving the same about its pivotal center, of a stop pivotally mounted on said track section on an axis extending longitudinally thereto, and means positively actuated by the movement of said track section for moving said stop about its pivotal center.

16. The combination, with a pivoted track section, and means for moving the same about its pivotal center, of a stop pivotally mounted on said track section, and a stationary member arranged near said track section and adapted to engage a part carried by said stop and move the latter about its pivotal center when said track section is moved about its pivotal center.

17. The combination, with a pivoted track section, and means for moving the same about its pivotal center, of a stop pivotally mounted on said track section and having a lateral projection, and a fixed member adapted to be engaged by said projection and to cause said stop to move about its pivotal center.

18. The combination, with a pivoted track section, and means for moving the same about its pivotal center, of a stop pivotally mounted on said track section and having a lateral projection, a fixed member adapted to be engaged by said projection and to cause said stop to move about its pivotal center, and means for adjusting the point of engagement of said projection with said fixed member.

19. The combination, with a movable track section, and means for moving the same into an inclined position, of a stop movably supported near said track section, means for moving said stop into an inoperative position when said movable track section is moved into an inclined position, and means to control the degree of inclination of said track section at which said stop will be actuated.

20. The combination, with a pivoted track section, and means for moving the same about its pivotal center, of a dog pivotally mounted on said track section and having a part adapted to extend into an operative position relatively thereto, a projection extending laterally from said dog and rigidly secured thereto, a stationary bracket arranged near said track section and having an opening into which said projection extends, whereby the movement of said track section in either direction will cause said projection to engage the upper or lower walls of said opening and thereby cause said dog to be moved into an inoperative or an operative position.

21. The combination, with an elevator, a track leading thereto and comprising a pivoted track section, of manually controlled means for moving said track section about its pivotal center, a stop supported near said track section and adapted to occupy an operative position when said track section is in its normal position, and means controlled by the movement of said track section about its pivotal center for moving said stop into an inoperative position.

22. The combination, with a fixed track section, and a vertically movable track section, of a stop pivotally supported near said fixed track section, means to retain said stop normally in an operative position, and means controlled by the downward movement of said movable track section to move said stop into an inoperative position.

23. The combination, with a fixed track section, and a vertically movable track section, of a stop pivotally supported near said fixed track section, a spring connected with said stop and tending to hold the same in an operative position, and means arranged to be actuated by the downward movement of said movable track section to move said stop into an inoperative position.

24. The combination, with a fixed track section, and a vertically movable track section, of a stop movably supported near said fixed track section, a lever connected with said stop, a spring to actuate said lever to move said stop into its operative position, and a part arranged to be actuated by the downward movement of said movable track section and operatively connected to said lever to move said stop into its operative position.

25. The combination, with a fixed track section, and a vertically movable track section, of stops movably supported near said fixed track section, toggle levers connected with said stops, means for moving said levers in one direction to move said stops into their operative positions, and means controlled by the downward movement of said movable track section for actuating said levers to move said stops into their inoperative positions.

26. The combination, with a fixed track section and a vertically movable track section, of stops movably supported near said fixed track section, toggle levers connected with said stops, a spring connected to said toggle levers to move said stops toward their operative positions, a bell crank lever connected with said toggle levers to move said stops into their inoperative positions and arranged to be actuated by the movement of said movable track section.

27. The combination, with a fixed track section, a vertically movable track section and stops arranged adjacent to the respective track sections, of means controlled by the downward movement of said movable track section to move the stop adjacent to said fixed track section into an inoperative position, and means controlled by the upward movement of said movable track section to move the stop adjacent thereto into an inoperative position.

28. The combination, with a fixed track section, a vertically movable track section, and stops adjacent to the respective track sections, of means positively actuated by the downward movement of said movable track section to move the stops adjacent to said fixed track section into inoperative positions, and means positively actuated by the upward movement of said movable track section to move the stops adjacent thereto into inoperative positions.

29. The combination, with an elevator platform, and a stop movably mounted thereon, of means for moving said stop into an inoperative position when the platform assumes its normal position and for retaining said stop in an operative position when said platform is moved away from its normal position, and means controlled independently of the movement of said platform to cause said stop to move into its operative position.

30. The combination, with an elevator platform adapted to support a car, and a stop pivotally mounted on said platform, of means controlled by the position of said platform, to retain said stop in an operative position when said platform is elevated and to move said stop into an inoperative position when said platform is moved into its normal position, and means controlled by the movement of said car relatively to said platform to cause said stop to assume an operative position.

31. The combination, with an elevator platform, a stop pivotally mounted thereon, and means to hold said stop normally in an operative position, of a trigger arranged to move said stop into an inoperative position, and automatic means for actuating said trigger to release said stop and permit it to move into an operative position.

32. The combination, with an elevator platform, a stop pivotally mounted thereon, and means to hold said stop normally in an operative position, of a trigger arranged to move said stop into an inoperative position, and a lever connected with said trigger and extending into the path of the car discharged from said platform, whereby the discharge of said car will actuate said trigger to release said stop and permit the same to move into its operative position.

33. The combination, with an elevator platform, a track leading thereto and comprising a fixed track section and a movable track section interposed between said fixed track section and said elevator platform, and stops arranged to control the movement of the cars on said fixed track section, said movable track section and said elevator platform, respectively, of means controlled by the movement of said movable track section for moving said stops into and out of their operative positions.

34. The combination, with an elevator platform, a track leading thereto and comprising a fixed track section and a movable track section interposed between said fixed track section and said elevator platform, and stops arranged to control the movement of the cars on said fixed track section, said movable track section and said elevator platform, respectively, of means actuated by the downward movement of said movable track section to move the stop for said fixed track section into an inoperative position, means actuated by the upward movement of said movable track section to move the stop therefor into an inoperative position, and means controlled by the upward movement of said movable track section for moving the stop for said elevator platform into an operative position.

35. The combination, with an elevator platform, a stop pivotally mounted thereon, and a track arranged to receive a car from said platform, of means to move said stop into an inoperative position when said platform assumes its normal position, and means to move said stop into an operative position when a car is discharged from said platform onto said track.

In testimony whereof I affix my signature in presence of two witnesses.

GRANT HOLMES.

Witnesses:
 WALTER C. LINDLEY,
 GERTRUDE C. KOCH.